United States Patent [19]
Sakai et al.

[11] Patent Number: 4,641,942
[45] Date of Patent: Feb. 10, 1987

[54] FOCUS DETECTING SYSTEM

[75] Inventors: Shinji Sakai; Nobuhiko Shinoda, both of Tokyo; Kazuya Hosoe, Kunitachi; Takao Kinoshita, Tokyo, all of Japan

[73] Assignee: Canon Kabushiki Kaisha, Tokyo, Japan

[21] Appl. No.: 767,668

[22] Filed: Aug. 21, 1985

Related U.S. Application Data

[63] Continuation of Ser. No. 627,488, Jul. 5, 1984, which is a continuation of Ser. No. 572,972, Jan. 23, 1984, abandoned, which is a continuation of Ser. No. 310,483, Oct. 9, 1981, abandoned.

[30] Foreign Application Priority Data

Oct. 16, 1980 [JP] Japan ................. 55-144781
Oct. 23, 1980 [JP] Japan ................. 55-149079
Jan. 14, 1981 [JP] Japan ................. 56-4357

[51] Int. Cl.$^4$ .................................................. G03B 3/00
[52] U.S. Cl. ..................... 354/406; 354/409; 354/195.13
[58] Field of Search ............... 354/406, 407, 402, 409, 354/471, 474, 475, 195.13, 289.1

[56] References Cited

U.S. PATENT DOCUMENTS

| | | | |
|---|---|---|---|
| 3,955,892 | 5/1976 | Numata et al. | 354/47 |
| 4,091,275 | 5/1978 | Wilwerding. | |
| 4,298,259 | 11/1981 | Aoki et al. | 354/31 |
| 4,319,238 | 3/1982 | Ogusawara | 354/409 |
| 4,327,284 | 4/1982 | Suzuki | 354/25 |
| 4,329,032 | 5/1982 | Aoki et al. | 354/25 |
| 4,341,953 | 7/1982 | Saki et al. | 354/25 |
| 4,411,505 | 10/1983 | Sakai et al. | 354/402 |
| 4,437,743 | 3/1984 | Sakai et al. | 354/402 |
| 4,445,761 | 5/1984 | Ishikawa et al. | 354/402 |
| 4,459,002 | 7/1984 | Sakai et al. | 354/402 |

Primary Examiner—Russell E. Adams
Attorney, Agent, or Firm—Fitzpatrick, Cella, Harper & Scinto

[57] ABSTRACT

A focus detecting system has a signal processing circuit for processing output signals from photoelectric transducer elements and generating an output representing the focusing state. A circuit is provided to stabilize the output against abrupt changes in focusing condition.

31 Claims, 25 Drawing Figures

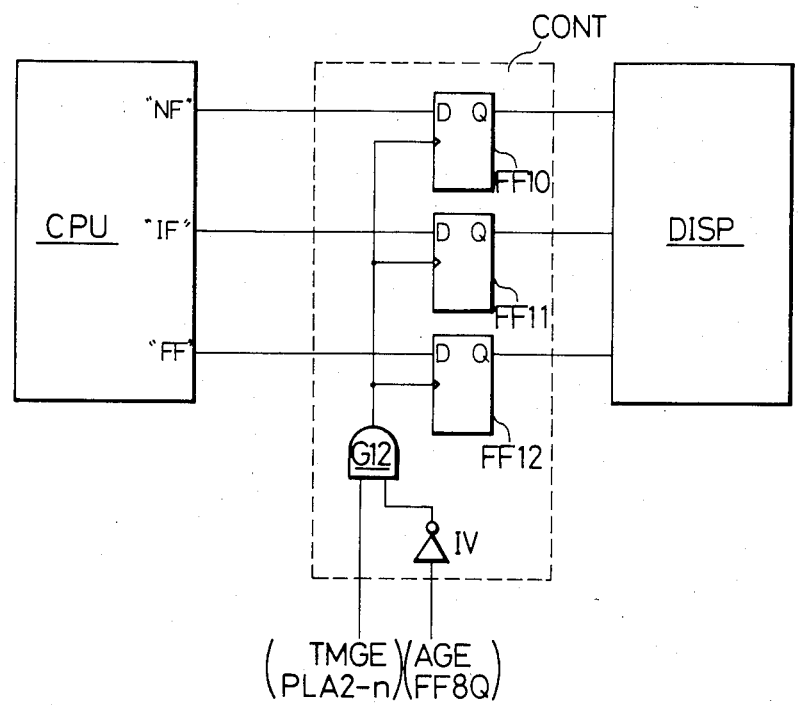

FIG. 12

|  | | A | B | C | D | E | F | G | H | I | J | K | L | M | N | O | P |
|---|---|---|---|---|---|---|---|---|---|---|---|---|---|---|---|---|---|
| THE LATEST DATA | NF | ○ | | | | ○ | | | | ○ | | | | ○ | | | |
| | IF | | | ○ | | | ○ | | | | | ○ | | | | ○ | | |
| | FF | | | | ○ | | | | ○ | | | | ○ | | | | ○ |
| LAST DATA | NF | | | | | ○ | ○ | ○ | | | | | | | | | |
| | IF | | | | | | | | | ○ | ○ | ○ | ○ | | | | |
| | FF | | | | | | | | | | | | | ○ | ○ | ○ | ○ |
| OUTPUT DATA | NF | ○ | | | | ○ | ○ | | | | | | | | | | |
| | IF | | | ○ | | | | ○ | | ○ | ○ | ○ | ○ | | | ○ | |
| | FF | | | | ○ | | | | ○ | | | | | ○ | | | ○ |

FIG. 15

| A | B | |
|---|---|---|
| 0 | 0 | ═══════════ |
| 1 | 0 | ⊓⊓⊓⊓⊓⊓⊓⊓⊓⊓⊓⊓⊓ |
| 0 | 1 | ⊓ ⊓ ⊓ ⊓ ⊓ ⊓ ⊓ |
| 1 | 1 | ⊓  ⊓  ⊓  ⊓ |

FOCUS DETECTING SYSTEM

This application is a continuation of application Ser. No. 627,488 filed July 5, 1984, which is a continuation of Ser. No. 572,972, filed Jan. 23, 1984, now abandoned, which is a continuation of Ser. No. 310,483 filed Oct. 9, 1981, now abandoned.

BACKGROUND OF THE INVENTION

1. Field of the Invention

The present invention relates to a focus detecting system and, more particularly, to a focus detecting system which performs focus detection for an optical system on the object, the optical system being so set as to cause changes in the image formation state of the image of the object in accordance with data processing of an image formation state of an image of an object formed on a solid image-pickup element such as a CCD, BBD, or CID or in an image pickup tube.

2. Description of the Prior Art

Various focus detecting systems for optical systems have been conventionally proposed. For example, an increasing number of focus detecting systems have been proposed which utilize solid image-pickup elements such as the CCD, BBD or CID, the practicability of which has recently become notable.

The characteristic feature of the image pickup tube or the solid image-pickup element referred to above resides in that extremely small photoelectric transducer elements are incorporated which output time-serial electric signals of small picture elements of an image formed on the tube. Therefore, the image pickup tube and the solid image-pickup element allow subsequent time-serial processing of the signals and therefore are suitable for processing with electric circuitry, in contrast to a conventional system which has a plurality of usual photoelectric elements on which the image of an object is formed to obtain photoelectric conversion signals of the image. Since the photoelectric transducer elements constituting the solid image-pickup element, unlike the usual photoelectric transducer elements, serve to store for a given period of time charges obtained by photoelectrically converting the energy of light incident thereon and to output time-serial signals, the area for each of these elements may be made very small so that the obtained time-serial signal train provides image signals of good resolution.

On the other hand, with a focus detecting system using an accumulating-type photoelectric transducer element, an abrupt change in the brightness of the object or an abrupt movement of the image on the accumulating-type photoelectric transducer elements results in an abrupt change in the accumulating time. This, in turn, results in an extremely unstable photoelectric output and thus an extremely unstable final output. For this reason, confirmation of the focusing state or control for focusing an optical system on an object may occasionally become impossible to perform.

In addition to this, with a focus detecting system of the type described above, the output signals corresponding to the focusing state are generated at time intervals corresponding to the accumulating time of the elements. Therefore, when such a system is applied to a camera, depending upon the focal length of the photographic lens used or upon the presence or absence of shaking, the image on the photoelectric transducer elements uninterruptedly moves in relatively great magnitudes, resulting in changes in the brightness and pattern of the image. The corresponding changes in the accumulating time and the focusing signals make the signals representing the focusing state unstable. When these signals are applied to an LED for indication of the focusing state, the LED flickers and does not provide a positive indication. When the system is applied to automatic focusing of a photographic lens, control of the photographic lens disadvantageously becomes unstable.

SUMMARY OF THE INVENTION

It is the primary object of the present invention to provide an improvement in a focus detecting system which eliminates the problems associated with the prior art focus detecting systems.

It is another object of the present invention to provide an improvement in a focus detecting system using a signal integrating-type image sensor which is capable of producing stable outputs with changes in the state of the system.

In order to achieve these objects, the present invention provides an improvement in a focus detecting system using a signal integrating-type image sensor which has a control means for constantly stabilizing outputs of the system with changes in the state of the system.

It is still another object of the present invention to provide an improvement in a focus detecting system using an accumulating-type photoelectric transducer element according to which, upon a change in the accumulating time, the output of the system corresponding to the latest focusing state may be suppressed or the last output immediately before the change may be maintained, depending upon the conditions of the change, to thereby stabilize the output of the system. This object is based on the following facts. With a focus detecting system using an accumulating-type photoelectric transducer element, abrupt changes in the brightness of an object or abrupt movements of the image on the element cause abrupt changes in the accumulating time. This results in an extremely unstable photoelectric output and an extremely unstable final output. For this reason, confirmation of the focusing state or control of focusing of the optical system may occasionally become impossible.

In order to achieve this object, according to another aspect of the present invention, there is provided a focus detecting system using an accumulating-type photoelectric transducer element which is capable of, upon a change in the accumulating time of the photoelectric transducer element, suppressing the output of the system corresponding to the latest focusing state or of holding the output to that immediately before the change, depending upon the changes in the accumulating time of the photoelectric transducer element, in order to thereby stabilize the output of the system.

It is still another object of the present invention to provide a focus detecting system using an accumulating-type photoelectric transducer element which eliminates the drawbacks of the conventional system of this type. With a conventional focus detecting system, output signals corresponding to focusing states are generated at time intervals corresponding to the accumulating time of the photoelectric transducer element. Therefore, when such a system is applied to a camera, depending upon the focal length of the photographic lens used or the presence or absence of shaking, the image on the photoelectric transducer element uninterruptedly moves in relatively great magnitudes, resulting in changes in the brightness and pattern of the image. Then, corresponding changes in the accumulating time and the focusing signal make signals representing the focusing state unstable. When these signals are supplied to an LED for indication of the focusing state, the LED flickers and does not provide a positive indication. When the system is applied to automatic focusing of a photographic lens, control of the photographic lens disadvantageously becomes unstable.

In order to achieve the above object, there is provided according to still another aspect of the present invention, a focus detecting system which stores the states of output signals and which changes the generating method of the signals, that is, the display method or the control method of the lens, according to the combination of the stored states and the state of the newly output signal, whereby the drawbacks of the prior art systems are eliminated.

It is still another object of the present invention to provide an improvement in a focus detecting system using an accumulating-type photoelectric transducer element which is capable of displaying a focusing state with a light-emitting element such as an LED in a stable manner, without being adversely affected by fluctuations in the brightness of the environment.

In order to achieve the above object, there is provided according to still another aspect of the present invention, a focus detecting system incorporating an accumulating-type photoelectric transducer element and a control means for controlling the luminance of display by decreasing the luminance of the display when the signal accumulating time of the photoelectric transducer element is long, and by increasing the luminance when the accumulating time is short.

Other objects and features of the present invention will become apparent from the following description when taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

FIGS. 9A and 9B are partial block diagrams showing examples of a display control circuitry in the circuit shown in FIG. 2;

FIG. 12 is a table showing an example of set contents in a ROM in the flicker the supressing circuit shown in FIG. 11;

FIG. 15 is a view showing the manner in which the luminance of display is modulated by the display luminance modulating circuit shown in FIG. 14.

DESCRIPTION OF THE PREFERRED EMBODIMENTS

Figure 1A:
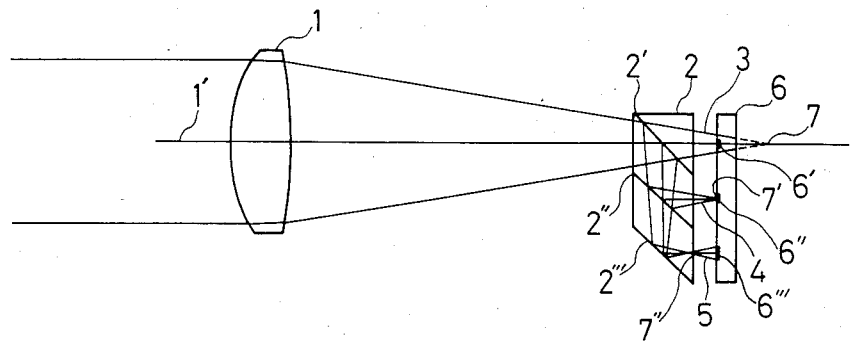

Referring to FIG. 1A, an imaging lens 1 has an optical axis 1'. A beam splitter 2 is arranged in the optical path of the imaging lens 1 and has semi-transmittal sections 2' and 2" and a total reflection section 2'''. Light emerging from the imaging lens 1 becomes incident on the semi-transm section 2', and is then divided by the semi-transmittal section 2" and the total reflection section 2''' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'''.

If the convergent point of the light ray 3 is at point 7, it is easily seen that the convergent points of the divided light rays 4 and 5 are at points 7' and 7", respectively. If the convergent point 7 of the light ray 4 which is reflected and divided by the semi-transmittal sections 2' and 2" coincide, with the light-receiving section 6", the convergent point 7 of the light ray 3 incident on the light-receiving section 6' is located behind the light-receiving section 6', and the convergent point 7" of the light ray 5 incident on the light-receiving section 6''' is located in front of the light-receiving section 6'''. The deviations of these converging points from the light-receiving sections become the same if the distances between the semi-transmittal sections 2' and 2" and between 2" and the total reflection section 2''' are equal to each other. As a result, the sharpness of the image on the light-receiving section 6" becomes maximum, and the sharpnesses of the images on the light-receiving sections 6' and 6''' become low but are similar to each other.

Figure 1B:
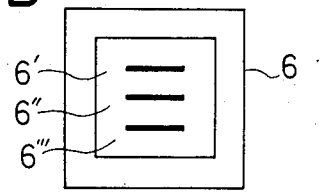
Figure 1C:
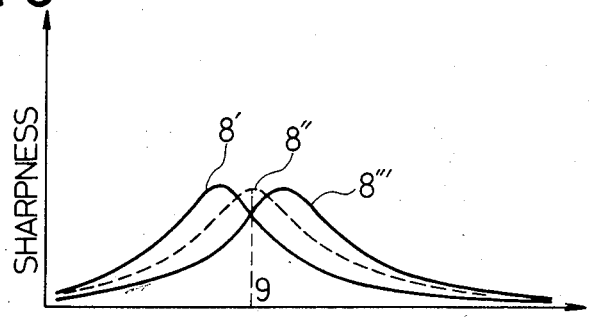

If the imaging lens 1 is displaced along the optical axis 1', the sharpnesses of the images on the light-receiving sections 6', 6" and 6"' change as shown in FIG. 1C. Curves 8', 8" and 8"' representing changes in the sharpnesses of the images on the light-receiving sections 6', 6" and 6"' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6"' are represented by the point 9 in FIG. 1C. Then, it is apparent from FIG. 1C that the relationships between the sharpnesses 8' and 8"' are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6"' comprise, for example, belt-shaped linear CCDs. However, the shape of the light-receiving sections is not necessarily limited to this shape.

Figure 2:
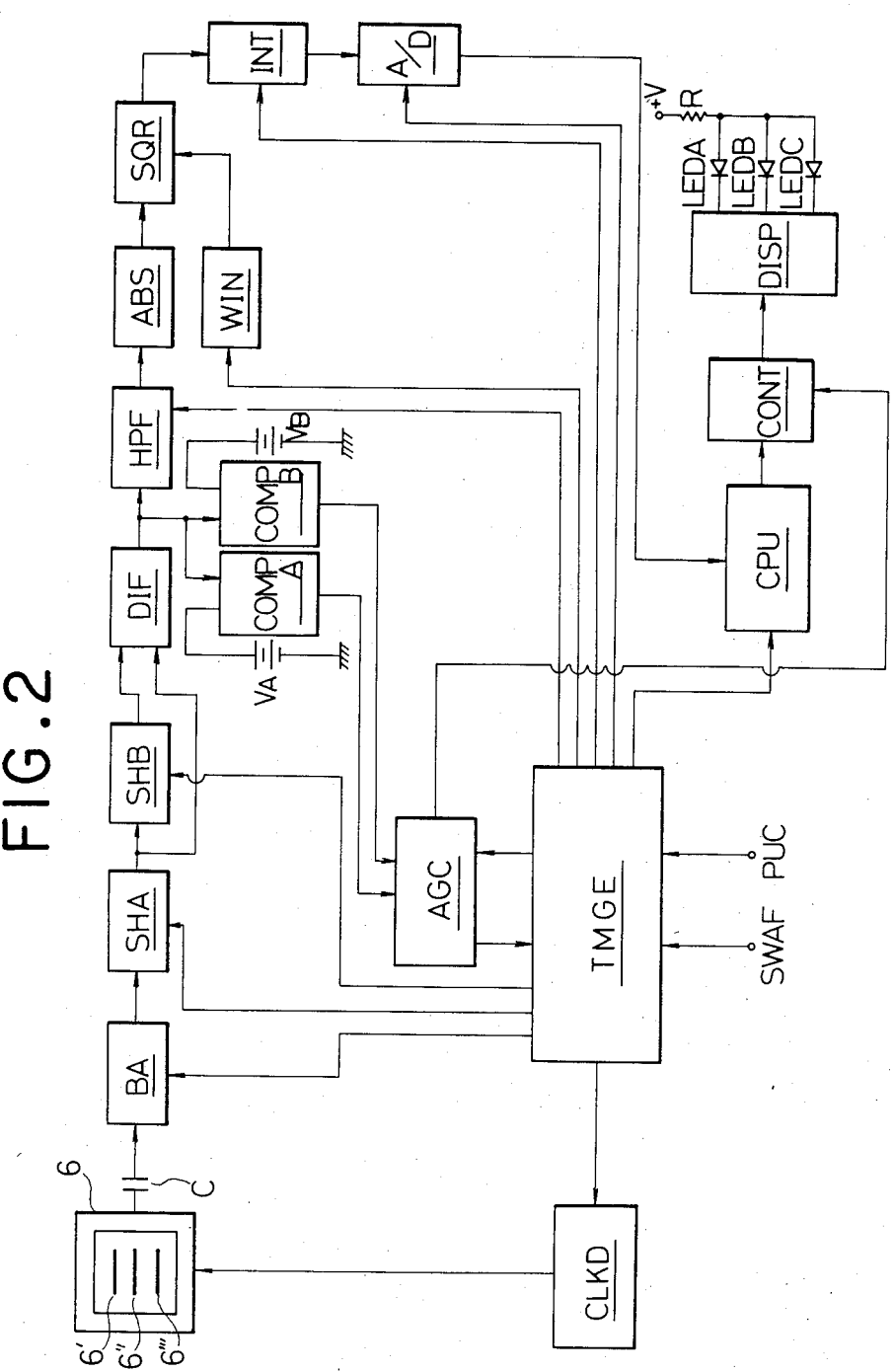
FIG. 2 is a block diagram showing the configuration of electric circuitry of an embodiment in which the improvement of the present invention is applied to a focus detecting system according to the principle shown in FIGS. 1A to 1C.

A focus detecting system is thus obtained which has the beam splitter 2 and the photoelectric transducer 6 with the three light-receiving sections 6', 6" and 6"'. FIG. 2 shows a block diagram of an electric circuit which reads image signals from the light-receiving sections 6', 6" and 6"', extracts sharpness signals, and discriminates the magnitudes of sharpness of the image at three points. Many of the blocks shown in FIG. 2 are of known configuration and details of them are shown in a series of applications as in U.S. patent application Ser. No. 59,635, "Focus Detecting System", Konoshita et al., filed on July 23, 1979 (corresponding German DOLS No. 29 30 636), U.S. patent application Ser. No. 151,703, "Image Sharpness Detecting System", Kawabata et al., filed on May 20, 1980 (corresponding to German Patent Application No. P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6"'. A series of clock signals for operating the CCD 6 are supplied from a clock driver CLKD. These clock signals are supplied to initiate a series of operations of the CCD 6 such as integration, transfer, resetting and so on in a predetermined order. The charge stored for a predetermined period of time in the CDD 6 is charge-voltage converted at the output of the CCD 6 and is thereafter input, as an image signal, to a balance adjusting circuit BA through a capacitor C for suppressing noise. These image signals corresponding to the three light-receiving sections 6', 6" and 6"'40 of the CCD 6 are time-serially read out in an order which is determined by the configuration of the CCD 6.

Figure 3:
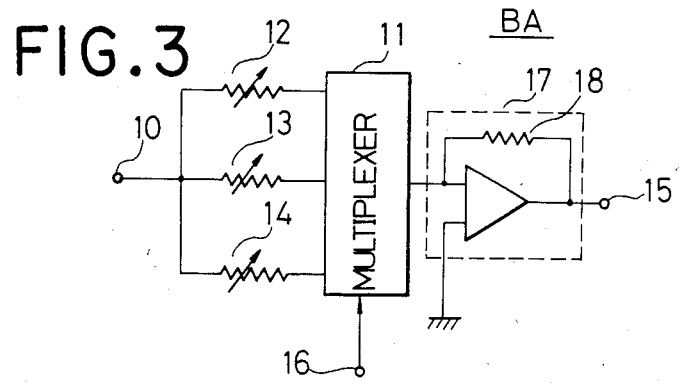
FIG. 3 is a partial circuit diagram showing an example of a balance adjusting circuit shown in the circuitry of FIG. 2.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6"' through the variable resistors 12, 13 and 14, respectively, and outputs them to an amplifier 17. The variable resistors 12, 13 and 14 control the balance of the image signals from the light-receiving sections 6', 6" and 6"'. The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal as it is contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to thereby remove the influence of the dark current. The dark current bit (not shown) is included at the end of each of the light-receiving sections 6', 6" and 6"' of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB for taking the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

Figure 4A:
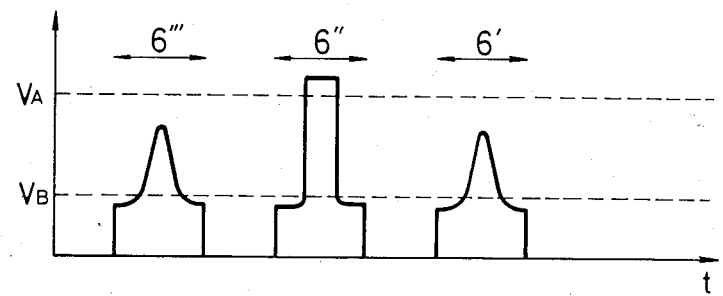
FIGS. 4A to 4C show signal waveforms for explaining the function of a window comparator shown in FIG. 2, which discriminates if the accumulating time is appropriate.
Figure 4B:
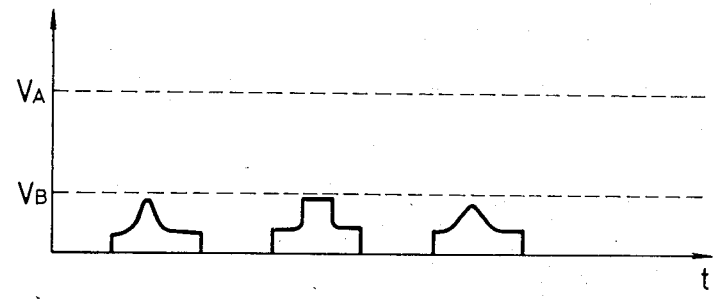
Figure 4C:
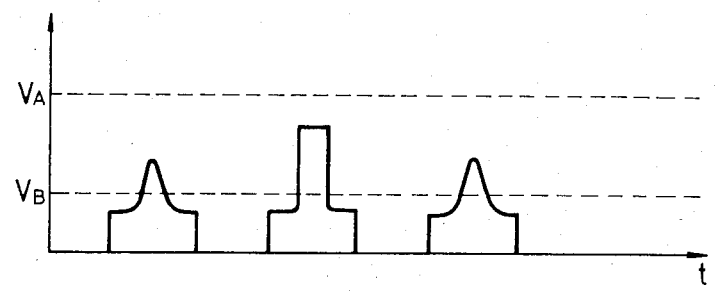

The mode of operation of the window comparator will now be described with reference to FIGS. 4A–4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The ranges in FIG. 4A indicated by arrows at 6''', 6'' and 6' represent the timings with which the image signals are output from the light-receiving sections 6''', 6'' and 6', respectively. In FIG. 4A, part of the dark current-compensated signal (part of 6'') exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If VA>VB in this embodiment, when the outputs of both the comparators COMPA and COMPB are at high level, it indicates that the dark current-compensated signal is at too high level including saturated level. When the outputs of both the comparators COMPA and COMPB are at low level, it indicates that the dark current-compensated signal level is too low. Only when the output of the comparator COMPA is at low level and the output of the comparator COMPB is at high level, does it indicate that the dark current-compensated signal is at a suitable level.

The outputs of the comparators COMPA and COMPB are supplied to a integrating time control circuit AGC for maintaining the appropriate dark current-compensated signal level by shortening the accumulating time of the CCD 6 when it is too high and by prolonging the integrating time when it is too low. In response to a synchronizing signal from the timin generator TMGE, the accumulating time control circuit AGC operates so that it may be able to discriminate the state of the outputs of the comparators COMPA and COMPB at the timing at which the dark current-compensated signals are output from the light-receiving sections 6', 6'' and 6'''. Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6'' and 6''' of the CCD 6 are input. This is to prevent the generation of an output from the high-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs might cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6'' and 6''' of the CCD 6, the window function generating circuit WIN controls the gain of the squaring circuit according to the relationship determined in correspondence with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the lightreceiving sections 6', 6" and 6'". In this manner, the output of the integrating circuit INT corresponds to the electric output such as the sharpness of the respective images corresponding to the order of output from the light-receiving sections 6', 6" and 6'" of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A–5F show the output waveforms of the respective blocks of the circuitry in order to clarify the analog processing of the series of signals representing the sharpness of the image, starting from the read-out of the image signals from the light-receiving sections 6', 6" and 6'" of the CCD 6 (the field of view for the three images) until the integration at the integrating circuit INT. In FIGS. 5A–5F, time is plotted as the abscissa and the voltage or current output is plotted as the ordinate in arbitrary units. The ranges indicated at arrows 6', 6" and 6'" in FIG. 5A–5F represent the timings with which the signals corresponding to the lightreceiving sections 6', 6" and 6'" of the CCD 6 are output and processed. The state of the respective images corresponds to the in-focus state of the imaging lens 1 in which the sharpness of the image of the light-receiving section 6" is highest, that is, the sharpness as shown at 9 in FIG. 1C is highest. FIGS. 5A–5F shows the state of the signal output from the CCD 6 only once, but these signals are repeatedly output in practice.

Figure 5A:
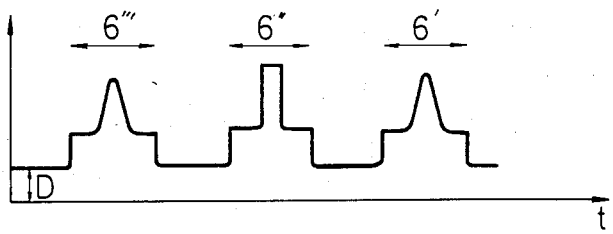
FIGS. 5A to 5F show output waveforms of the outputs of the main blocks of the circuitry shown in FIG. 2.
Figure 5B:
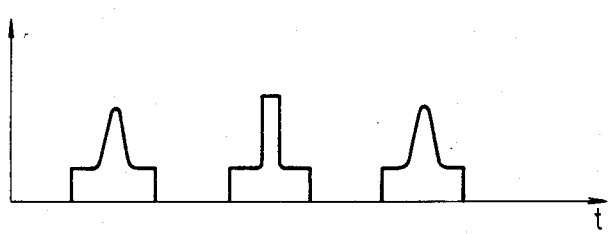
Figure 5C:
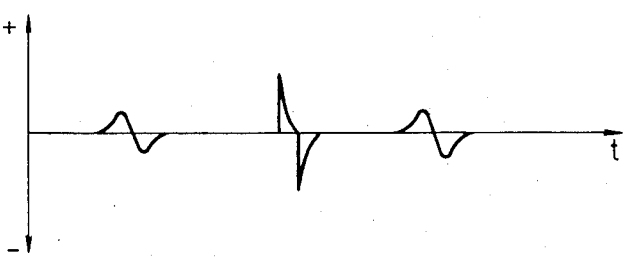
Figure 5D:
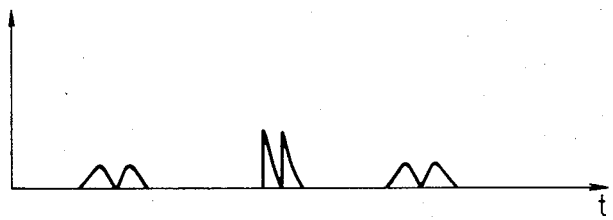
Figure 5E:
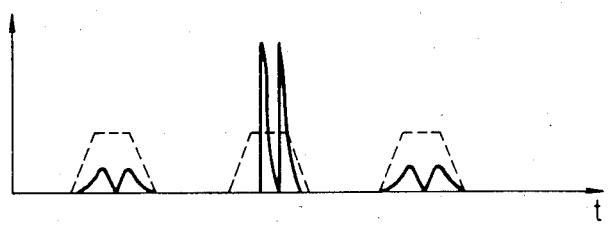
Figure 5F:
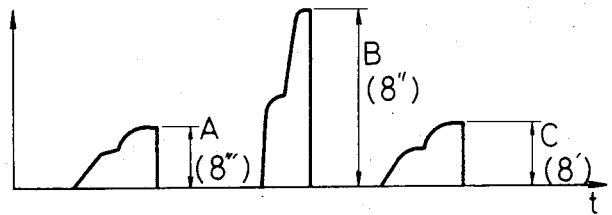

FIG. 5A shows the image signal which is output from the CCD 6 and has passed through the sampling and holding circuit SHA. The order for output of the images from the light-receiving sections is 6'", 6" and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5F shows the output of the integrating circuit INT wherein levels A(8'"), B(8") and C(8') correspond to the sharpnesses of the images on the light-receiving sections 6'", 6" and 6', respectively. Specifically, A, B and C in FIG. 5F correspond to the levels of the curves 8'", 8" and 8' of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions B>A, B>C and A=C are satisfied. In the near-focus state, condition C>A is satisfied, and in the far-focus state, condition A>C is satisfied. The CPU discriminates which set of conditions is satisfied and outputs a signal corresponding to one of these three states. As the algorithm for the discrimination at the CPU may be adopted the algorithm as disclosed in U.S. patent application Ser. No. 151,533, "Focus Detecting System", Sakai et al., filed on May 19, 1980 (corresponding to German Pat. Application No. P 30 19 901.0) of the same assignee or in the U.S. patent application Ser. No. 310,373 filed on the same day by Shinji Sakai, Nobuhiko Shinoda, Takao Kinoshita, Kazuya Hosoe and Takashi Kawabata (corresponding to Japanese Pat. Application No. 144782/1980).

The output signal of the CPU is supplied to a display control circuit CONT. In response to the signal from the accumulating time control circuit AGC representing the change in the accumulating time of the CCD 6, the display control circuit CONT transmits the conditions from the CPU to a display circuit DISP. If the illumination of the image abruptly becomes high and the accumulating time changes to be shorter, at least part of the image signal at such an instant may saturate or come close to saturation, resulting in erratic or unstable output. In such a case, in order to prevent this, the display control circuit CONT prohibits the transmission of the signal to the display circuit DISP. On the other hand, when the illumination of the image abruptly becomes low, the image signal may become low but tends to result in erratic output less frequently. In such a case, the display control circuit CONT transmits the controls from the CPU to the display circuit. The display control circuit CONT may function to hold the immediately preceding output when the accumulating time is changed to be shorter. The detailed configuration of the display control circuit CONT will be described later. The output of the display control circuit CONT is input to the display circuit DISP. The display circuit DISP basically comprises a logic circuit and a drive circuit for driving indicators such as LEDs. In response to the commands from the central processing circuit CPU, in this embodiment, the display circuit DISP lights up a light-emitting diode LEDA in the in-focus state. In the near-focus state and the far-focus state, the display circuit DISP lights up light-emitting diodes LEDB and LEDC, respectively, to indicate that the imaging lens 1 is in the near-focus state and the far-focus state, respectively. A protective resistor R is incorporated to protect the light emitting diodes LEDA to LEDC when a voltage V is supplied to them. Although LEDs are used in this embodiment, liquid crystal display devices, electrochromines or the like may be used.

The configuration of the timing generator TMGE will be described with reference to FIGS. 6 and 7.

Figure 6:
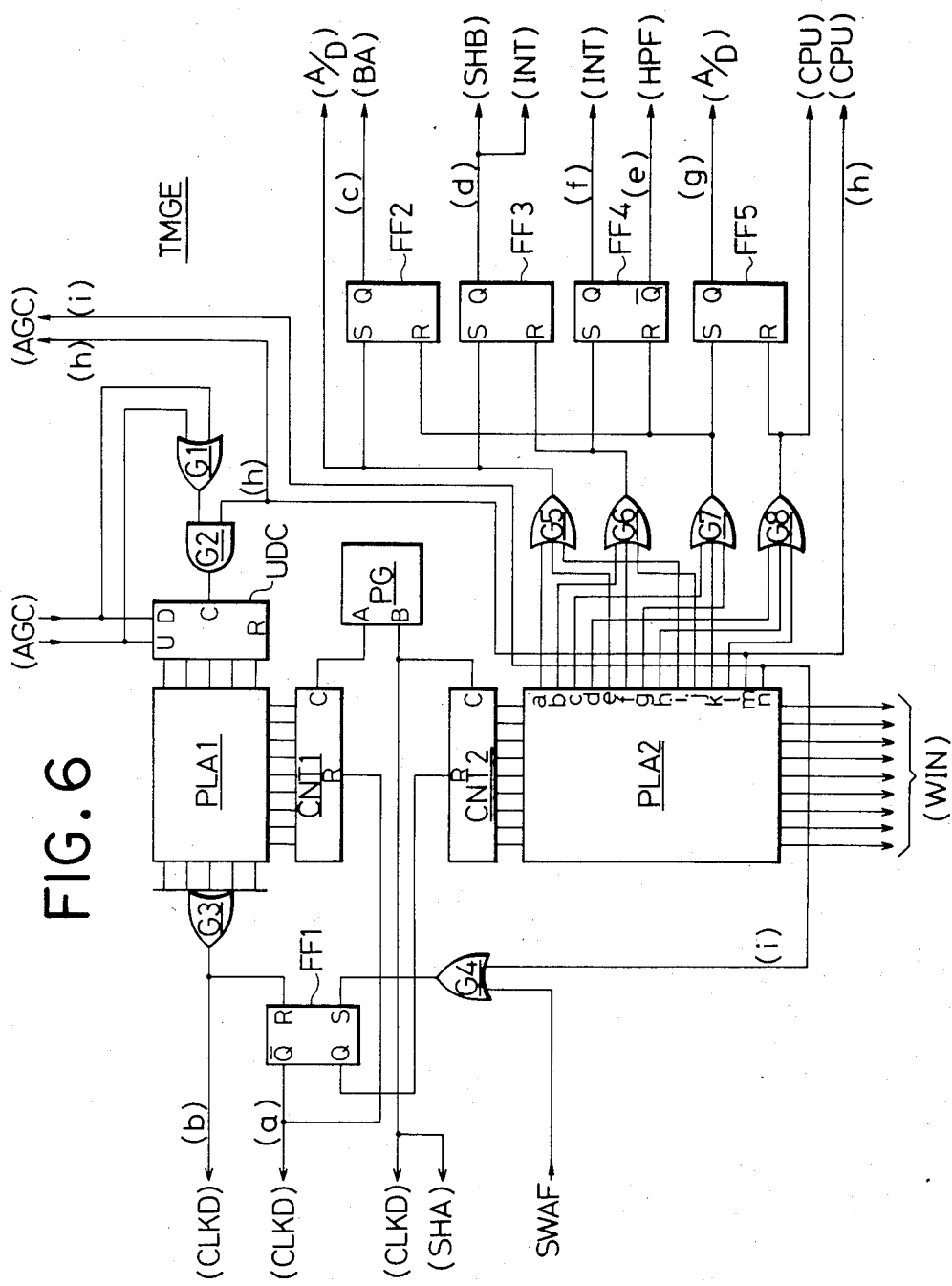
FIG. 6 is a block diagram showing the configuration of a timing generator in the circuitry shown in FIG. 2.
Figure 7:
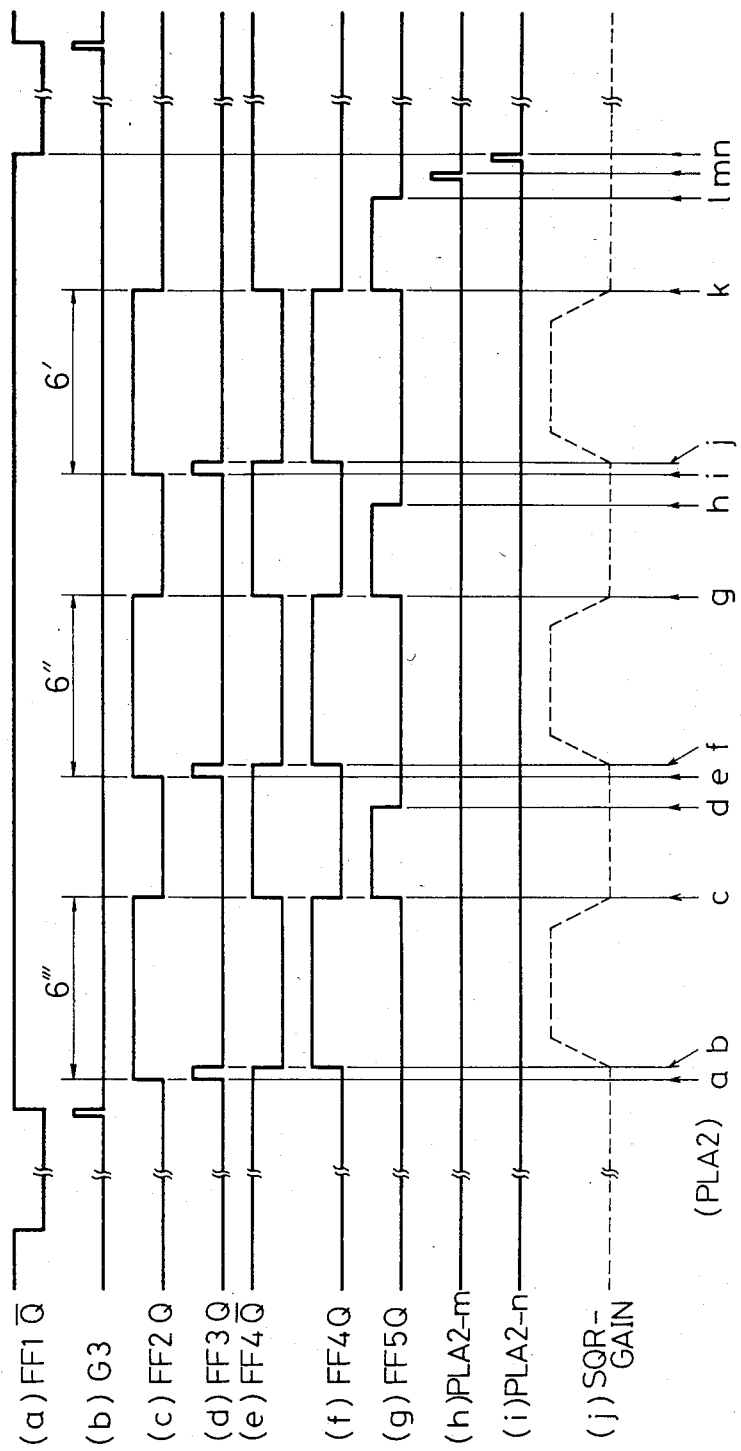
FIG. 7 is a timing chart showing timing signals for controlling various operations which are output from the timing generator shown in FIG. 6.

Referring to FIG. 6, the part of the circuitry consisting of an up/down counter UDC, a counter CNT1, a programmable logic array PLA1, and gate G2 and OR gates G1 and G3 mainly serves to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\overline{Q}$ output of the RS flip-flop FF1 is supplied to the counter CNT1 as a reset signal. Therefore, the counter CNT1 performs counting only during the interval in which the $\overline{Q}$ output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown at a to n in FIG. 7 after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D conversion circuit A/D as an A-D conversion command. The output of the OR gate G5 is supplied to the A/D converting circuit A-D as a reset signal. The output of the OR gate G8 is supplied to the central processing circuit CPU as a strobe pulse for storing the output from the A-D converting circuit A/D. The output (FIG. 7(h)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC as a reset signal for the flip-flop therein. The Q output of flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration disclosed in U.S. patent application Ser. No. 151,703, filed on May 20, 1980 by Kawabata et al. (corresponding to German Pat. Application No. P 30 19 908.7) of the assignee of the present invention.

Figure 8:
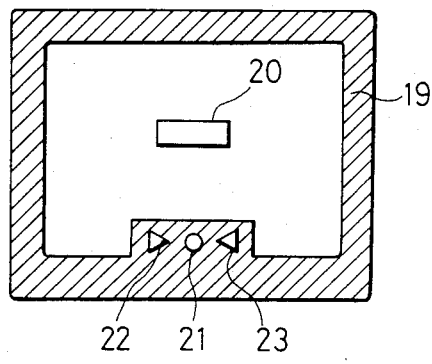
FIG. 8 is a model view showing an example wherein the focus detecting system as shown in FIG. 1 is applied to a camera.

FIG. 8 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDA shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDB and LEDC shown in FIG. 2 are arranged immediately behind the arrow marks 22 and 23, respectively. In this manner, the operator is capable of confirming the focusing state of the photographic lens simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

The configuration of the display control circuit CONT will now be described with reference to FIGS. 9A and 9B.

Figure 9A:
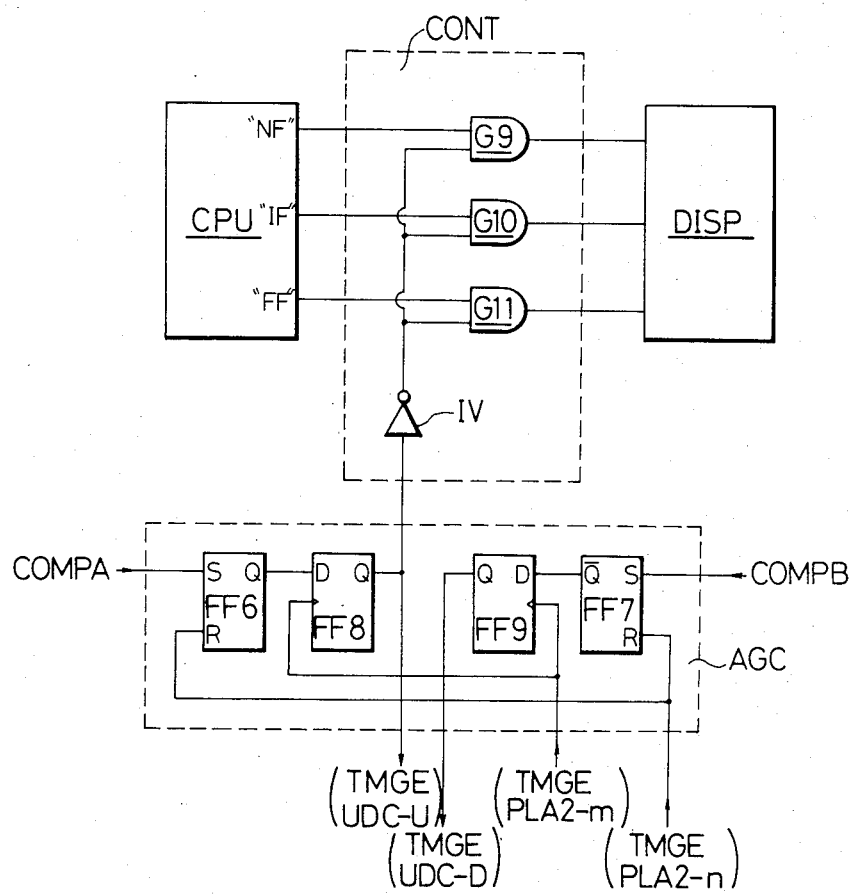

Describing first the configuration of the accumulating time control circuit AGC, referring to FIG. 9A, an RS flip-flop FF6 is set by an output of high level of the comparator COMPA, and an RS flip-flop FF7 is set by an output of high level of the comparator COMPB. Both of these RS flip-flops FF6 and FF7 are reset by an output (FIG. 7(i)) of high level from the terminal n of the programmable logic array PLA2 in the timing generator TMGE shown in FIG. 6. In response to an output (FIG. 7(h)) of high level from the terminal m of the programmable logic array PLA2 in the timing generator TMGE, a D flip-flop FF8 latches the Q output of the RS flip-flop FF6, and a D flip-flop FF9 latches the Q output of the RS flip-flop FF7. A high level of the Q output from the D flip-flop FF8 represents the shortening of the accumulating time, and a high level of the Q output of the D flip-flop FF9 represents the prolongation of the accumulating time. These outputs are supplied to count mode setting terminals U and D of the up/down counter UDC in the timing generator TMGE shown in FIG. 6.

The display control circuit CONT shown in FIGS. 9A and 9B has AND gates G9, G10 and G11 which respectively receive at one input a signal NF representing the near-focus state, a signal IF representing the in-focus state, and a signal FF representing the far-focus signal, from the central processing circuit CPU. An inverter IV inverts the Q output from the D flip-flop FF8 in the accumulating time control circuit AGC, and the output of the inverter IV is supplied to the other input of each of the AND gates G9 to G11. The outputs of the AND gates G9 to G11 are supplied to the display circuit DISP.

With the display control circuit CONT of the configuration described above, when the output of the D flip-flop FF8 of the accumulating time control circuit AGC goes to high level, that is, when the shortening of the accumulating time of the CCD 6 is commanded to the timing generator TMGE, the output of the inverter IV goes to low level, so that the outputs of the AND gates G9 to G11 go to low level. Therefore, display by the display circuit DISP is prohibited.

Although it has not been mentioned before, the central processing circuit CPU makes the signals NF, IF and FF representing the near-focus state, the in-focus state and the far focus state, respectively, to high level.

In the embodiment of the display control circuit CONT shown in FIG. 9A, display by the display circuit DISP is prohibited in response to the accumulating time shortening command signal. However, instead of this configuration, the display conditions need not be changed but may be held to the immediately preceding display condition when the accumulating time shortening command signal is output. The configuration of this embodiment is shown in FIG. 9B. D flip-flops FF10, FF11 and FF12 receive at their D input ends, the respective signals NF, IF and FF from the central processing circuit CPU. The Q outputs of the D flip-flops FF10, FF11 and FF12 are supplied to the display circuit DISP. An AND gate G12 receives the output of the inverter IV as in FIG. 9A and the output (FIG. 7(i)) from the terminal n of the programmable logic array PLA2 in the timing generator TMGE shown in FIG. 6. The output of the AND gate G12 is supplied as a latch pulse to the D flip-flops FF10, FF11 and FF12.

With the display control circuit CONT of this configuration, when the accumulating time shortening command from the accumulating time control circuit AGC is produced, the output of the inverter IV goes to low level. Therefore, the latch pulse is no longer supplied to the D flip-flops FF10 to FF12, and the display condition of the display circuit DISP is not changed but is held to the immediately preceding display condition.

The output of the system may be stabilized according to the changes in the accumulating time in this manner. In the case of the embodiment described above, the display output for display of the focusing state is stabilized. However, the present invention is not necessarily limited to the stabilization of this kind of display output, but may be extended to stabilization of an automatic focusing output of the photographic lens.

Still another embodiment of the present invention will now be described with reference to FIG. 10.

Figure 10:
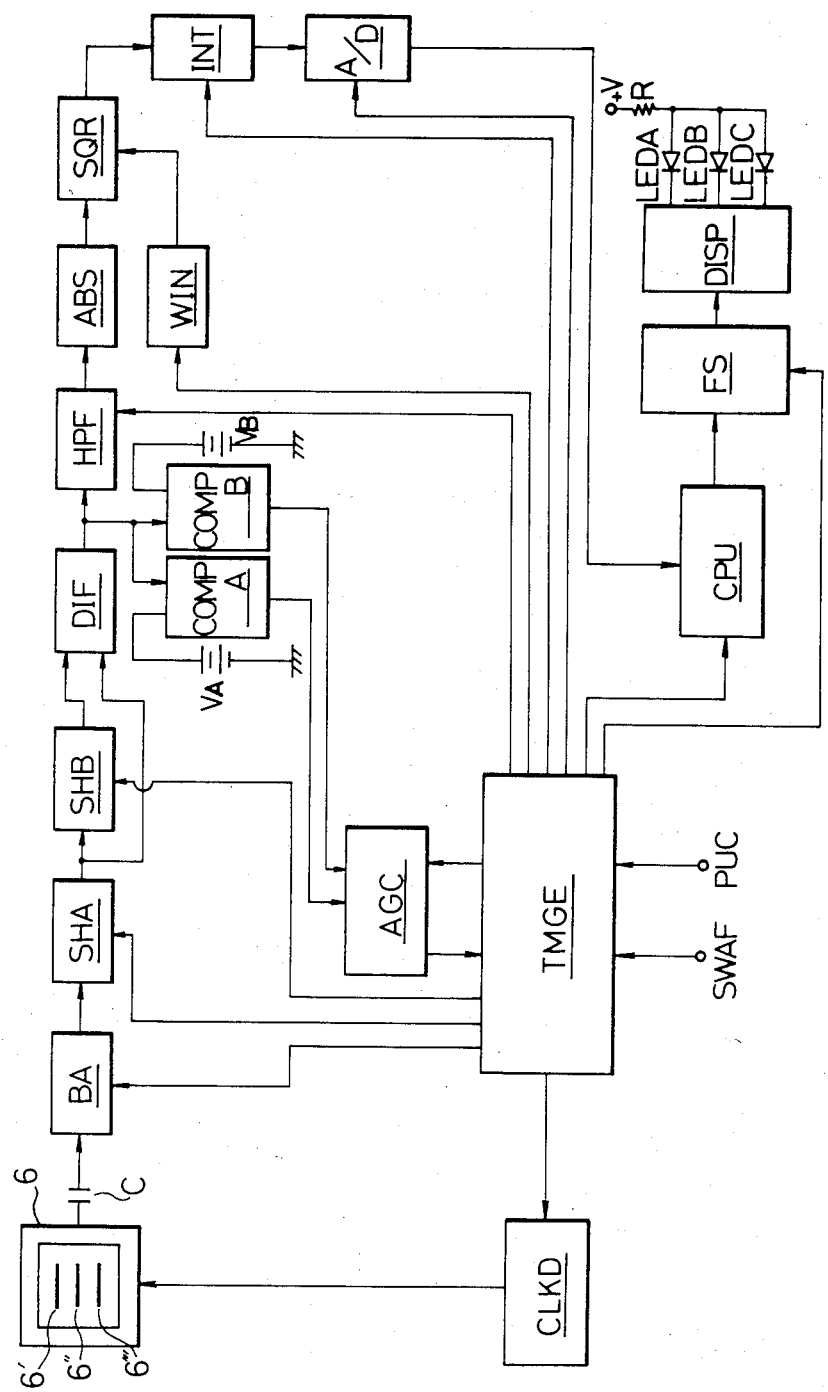
FIG. 10 is a block diagram showing the configuration of electric circuitry according to another embodiment of the present invention.

The embodiment shown in FIG. 10 differs from that shown in FIG. 2 only in that a flicker supressing circuit FS for stabilizing the input to the display circuit DISP is incorporated in place of the display control circuit CONT.

Figure 11:
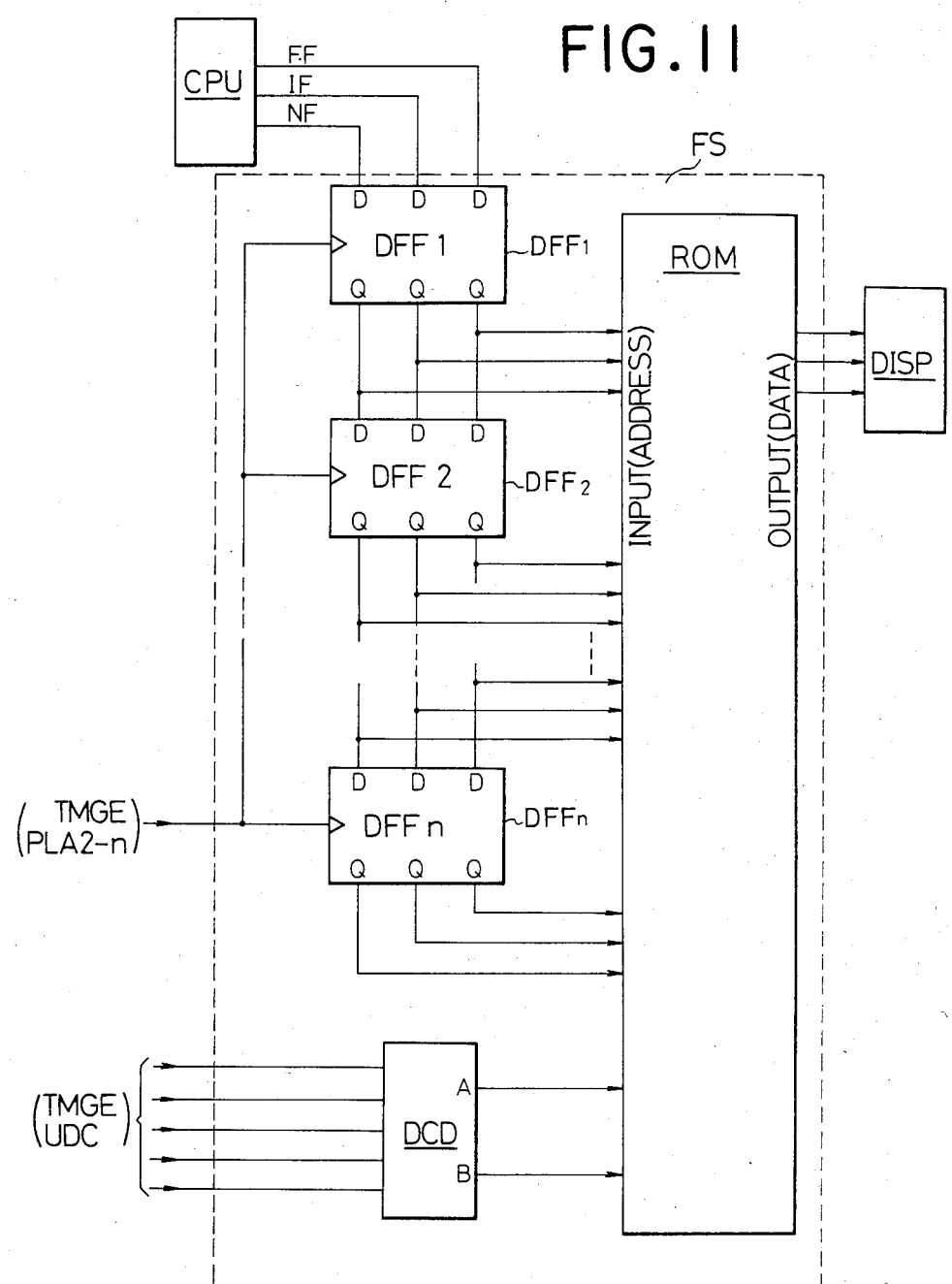
FIG. 11 is a partial block diagram showing an example of a flicker supressing circuit in the circuitry shown in FIG. 10.

FIG. 11 shows an example of the flicker suppressing circuit FS described above comprising a ROM. FIG. 12 shows an example of the contents in the ROM, which determines the output form of the display circuit DISP according to the combination of the states of the last signal and the latest signal. Data (signal) to be used is not limited to the example shown in FIG. 12; it is also possible to use data which is obtained from the display circuit DISP n times before the latest data. Although the output is more stabilized if n is greater, a greater value of n results in degradation of the responses. Therefore, n must be appropriately selected, taking these facts into consideration.

If the accumulating time is long, the response becomes slow if only the latest data is used. For this reason, in the example shown in FIG. 11, the accumulating time is divided into four ranges and the number of data signals is varied according to the respective ranges.

Referring to FIG. 11, the signals NF, IF and FF representing the near-focus state, the in-focus state, and the far-focus state are output from the central processing circuit CPU after every scanning operation. The output from the central processing circuit CPU has four kinds of states: one of the signals NF, IF and FF is at high level, or all of these signals are at low level (no display output obtained). The signal is supplied to a D flip-flop DFF1. In response to the signal shown in FIG. 7(i) from the terminal n of the programmable logic array PLA2 in the timing generator TMGE shown in FIG. 6, the operation result is output from the CPU. Thereafter, the signal is latched in a read-only memory ROM and is also supplied to a D flip-flop DDF2 of the next stage. In response to the timing signals from the timing generator TMGE, the latest data, the last data, . . . , and (n−1)th data previous to the latest data are transferred. Simultaneously, these data are input to the ROM and the output data corresponding to the contents of the ROM are sent to the display circuit DISP of the later stage.

The output of the up/down counter UDC in the timing generator TMGE in FIG. 6 is supplied to a decoder DCD, and is there converted into data of four steps determined by signals A and B of two bits according to the length of the accumulating time. The accumulating time is divided in advance into four steps according to the combinations of the high and low levels of the outputs A and B of the decoder DCD. According to the steps thus determined, the number of data signals used is increased when the accumulating time is shorter, and the number of data signals is increased when the accumulating time is longer, so that the response may not be impaired when the output of the display circuit DISP is stabilized.

FIG. 12 shows an example of the output data for using the latest data and the last data. For example, when the latest data is the signal NF and the last data is also the signal NF as in column F in FIG. 12, the signal NF is output. When the changes in the signals are great, for example, the last data is the signal IF and the latest data is the signal NF as in column J, the output data is the signal IF. If the signal IF is output once, even if the data changes in a short period of time immediately following, the signal IF is output since the focusing state is known not to change very much during such a short period of time. Therefore, the display becomes stabilized, less flickering occurs, and the focusing precision is not degraded.

With the simple circuit configuration and the adoption of the ROM in the embodiment described above, the display of the focusing state or the automatic focusing of the photographic lens may be performed in a stable manner and with high precision.

If the luminance is constant for displaying the focus detection result (focusing state of the photographic lens) with light-emitting elements in the range finder of a camera as shown in FIG. 8, the display is hard to see when the surrounding environment is bright. On the other hand, if the luminance of the display is high when the surrounding environment is not so bright, power is consumed needlessly.

An improvement solving this problem will be described with reference to FIG. 13.

Figure 13:
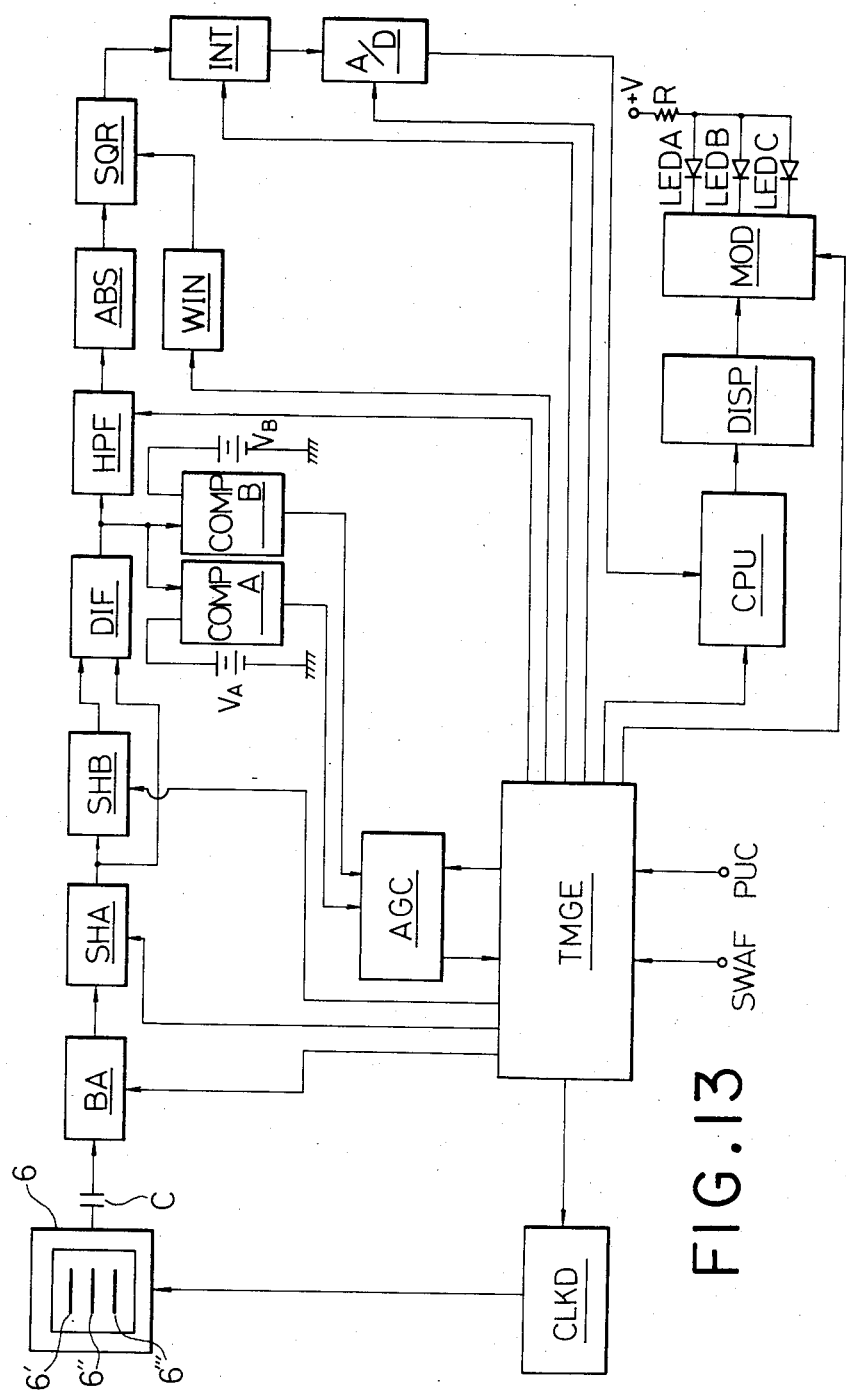
FIG. 13 is a block diagram showing the configuration of electric circuitry according to still another embodiment of the present invention.

In the circuit configuration shown in FIG. 13, a display luminance modulating circuit MOD is interposed between the display circuit DISP and the light-emitting diodes LEDA to LEDC. The display luminance modulating circuit MOD serves to increase the luminance of the display by the light-emitting diodes LEDA to LEDC as the accumulating time of the CCD 6 becomes shorter.

Figure 14:
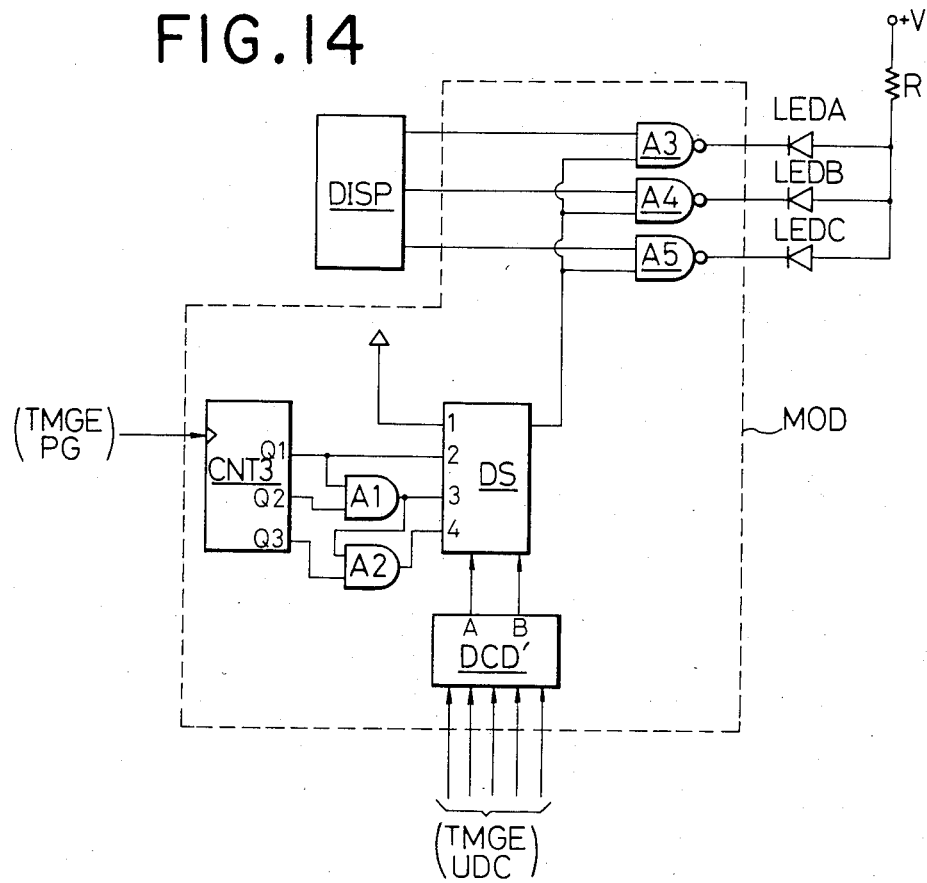
FIG. 14 is a partial block diagram showing an example of the configuration of a display luminance modulating circuit in the circuitry shown in FIG. 13.
Figure 15:
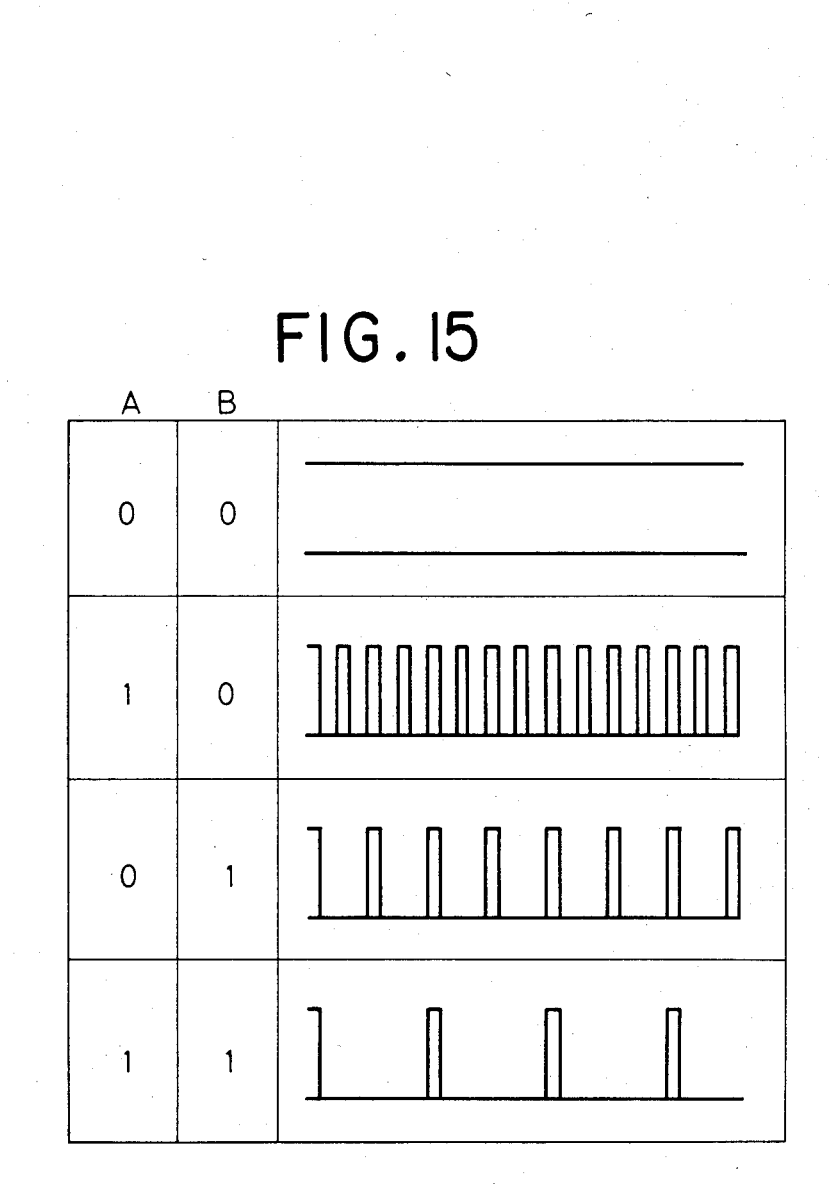

FIG. 14 is a circuit diagram showing the details of the display luminance modulating circuit MOD described above. A counter CNT3 counts pulses of suitable frequency from the timing generator TMGE in FIG. 6 and outputs frequency-divided outputs Q1, Q2 and Q3. The output Q1 is a pulse which is the same as the input pulse, the output Q2 is a pulse of half the frequency of that of the input pulse, and the output Q3 is a pulse of one-fourth the frequency of that of the input pulse. A data selector DS receives these pulses at its input terminals 1 to 4. In response to outputs A and B from a decoder DCD' of the same configuration as the decoder DCD shown in FIG. 11, the data selector DS generates a signal for controlling the duty cycle of the flashing of the light-emitting diodes LEDA to LEDC. The input terminal 1 of the data selector DS receives from a suitable power source an input which is constantly at high level. The input terminal 2 receives the output Q1. The input terminal 3 receives an AND signal produced by an AND gate A1, that is, a pulse having a duty cycle which is half that of the output Q1. The input terminal 4 receives AND outputs of the outputs Q1, Q2 and Q3 from the AND gates A1 and A2, that is, pulses having a duty cycle which is one-fourth that of the output Q1. According to the combination of high and low levels of the outputs A and B from the decoder DCD', the data selector DS outputs one of the input signals from the input terminals 1 to 4 to NAND gates A3, A4 and A5. This is shown in FIG. 15. As may be seen from FIG. 15, when the accumulating time of the CCD 6 is extremely long, the signals A and B are both at level "0" and the signal input to the input terminal 1 is selected. When the accumulating time is relatively long, the signal A is at level "1" and the signal B is at level "0", and the signal input to the input terminal 2 is selected. When the accumulating time is relatively short, the signal A is at level "0"0 and the signal B is at level "1", and the signal input to the input terminal 3 is selected. When the accumulating time is extremely short, the signals A and B are both at level "1", and the signal input to the input terminal 4 is selected. The output of the data selector DS is supplied to the NAND gates A3, A4 and A5 where NAND products of the output from the data selector DS with the output corresponding to the near-focus state, the in-focus state and the far-focus state from the display circuit DISP are generated to change the duty cycle of flashing of the LED according to the accumulating time. When the surrounding environment is very bright, the signals A and B are both at level "0" and the LED is kept lit. When the luminance is high and the surrounding environment is dark, for example, the signals A and B are both at level "1". Then, the duty cycle becomes ⅛ and the luminance is decreased. However, since the surrounding environment is dark, the display can be observed without difficulty.

In summary, according to the improvements of the present invention, luminance modulation of the display may be performed according to the brightness of the surrounding environment using a simple circuit configuration. Since a CCD as a photoelectric transducer element for focus detection may be used for detecting the brightness of the surrounding environment, a separate photometer need not be used, providing a "closed system" which is still capable of achieving such detection. The display may also be performed according to the brightness of the object.

What we claim is:

1. A system for repeatedly detecting a state of focusing of an imaging optical system and repeatedly generating an output representing the focus state, comprising:
    (A) image sensing means for repeatedly sensing an image of the object formed by the imaging optical system and generating a signal representing the image of the object in each repetition of the sensing operation of said image sensing means, wherein said image sensing means has signal integrating effects and generates a signal corresponding to the image;

(B) focus detecting means for receiving the signal from said image sensing means and detecting a focusing state of the imaging optical system on the object, said focus detecting means generating an output representing the focusing state in each repetition of the sensing operation of said image sensing means;

(C) means for stabilizing abrupt changes between the outputs sequentially provided in two consecutive repetitions of the sensing operation of said image sensing means from said focus detecting means; and means for controlling a signal integrating time of said image sensing means, said stabilizing means being responsive to said integrating time controlling means to stabilize the output of said focus detecting means against changes in the signal integrating time of said image sensing means.

2. A system according to claim 1, wherein said stabilizing means stablizes the output of said focus detecting means against shortening of the signal integrating time of said image sensing means by said integrating time controlling means.

3. A system according to claim 1 or 2, wherein the stabilization of the output of said focus detecting means by said stabilizing means includes suppression of the output of said focus detecting means.

4. A system for detecting a state of focusing of an imaging optical system on an object, comprising:
(A) image sensing means for repeatedly sensing an image of the object formed by the imaging optical system, said image sensing means generating a signal corresponding to the image;
(B) focus detecting means for receiving the signal from said image sensing means and detecting a focusing state of said imaging optical system on the object, said focus detecting means generating an output representing the focusing state; and
(C) means for stabilizing the abrupt change of the output of said focus detecting means, said stabilizing means including:
memory means for storing the output of said focus detecting means; and
means for selecting an output of said memory means and a new output of said focus detecting means as the output of said focus detecting means according to the conditions in said focus detecting system.

5. A system according to claim 4, wherein said selecting means determines the output of said focus detecting means in accordance with the output of said memory means and the new output from the focus detecting means.

6. A system according to claim 5, wherein said image sensing means has signal integrating effects, and further comprising:
means for controlling a signal integrating time of said image sensing means, said memory means including a plurality of memory stages for separately storing the outputs of said focus detecting means in a plurality of operation cycles, said selecting means being responsive to said integrating time controlling means to change the number of outputs stored in said memory means in accordance with the signal integrating time of controlling means, and said outputs stored in said memory means serving as a basis for determining the output of said focus detecting system.

7. A system according to claim 6, wherein said selecting means increases the number of outputs stored in said memory means as a basis for determining the output of said focus detecting means, when the signal integrating time of said image sensing means determined by said integrating time controlling means becomes shorter.

8. A system according to claim 6 or 7 further comprising:
display means for displaying the focusing state of the imaging optical system on the object in accordance with the output of said focus detecting means, said display means including display light-emitting means; and
display luminance controlling means responsive to said integrating time controlling means to control an apparent brightness of said display light-emitting means in accordance with the signal integrating time of said image sensing means which is determined by said integrating time controlling means.

9. A system for detecting a state of focusing of an imaging optical system on an object, comprising:
(A) image sensing means for sensing an image of the object formed by the imaging optical system, said image sensing means having signal integrating effects and generating a signal corresponding to the image;
(B) focus detecting means for receiving the signal from said image sensing means and detecting a focusing state of the imaging optical system on the object, said focus detecting means generating an output representing the focusing state;
(C) holding means for holding an output of said focus detecting means, holding time of said holding means corresponding to the time period required for one sensing operation of said image sensing means;
(D) focusing state outputting means whose operation is controlled in accordance with the output of said focus detecting means; and
(E) means for stabilizing an operation of said focusing state outputting means against fluctuations in the output of said focus detecting means due to changes in conditions in said focus detecting system.

10. A system for detecting a state of focusing of an imaging optical system on an object, comprising:
(A) image sensing means for sensing an image of the object formed by the imaging optical system, said image sensing means having signal integrating effects and generating a signal coresponding to the image;
(B) focus detecting means for receiving the signal from said image sensing means and detecting a focusing state of the imaging optical system on the object, said focus detecting means generating an output representing the focusing state;
(C) means for controlling a signal integrating time of said image sensing means on the basis of a signal corresponding to the light level of said image; and
(D) means for stabilizing the output of said focus detecting means against abrupt change on the basis of the integrating time of said image sensing means.

11. A system for detecting a state of focusing of an imaging optical system on an object, comprising:
   (A) image sensing means for sensing an image of the object formed by the imaging optical system, said image sensing means having signal integrating effects and generating a signal corresponding to the image;
   (B) focus detecting means for receiving the signal from said image sensing means and detecting a focusing state of the imaging optical system on the object, said focus detecting means generating an output representing the focusing state;
   (C) controlling means for controlling said focus detecting means to perform sequential generation of the outputs of said focus detecting means; and
   (D) selecting means for selecting one signal from the outputs sequentially generated from said focus detecting means on the basis of the integrating time of said image sensing means.

12. A system according to claim 10 or 11 further comprising display means for displaying the focusing state of said imaging optical system on the object in accordance with the output of said focus detecting means.

13. A system for detecting a state of focusing of an imaging optical system on an object and moving the imaging optical system on the basis of the detecting result to achieve an in-focus state of the imaging optical system on the object, comprising:
   (A) focusing-state signal generating means for detecting an image of the object formed by the imaging optical system and discriminating the focusing-state of the imaging optical system to time-sequentially generate a signal representing the focusing-state of the imaging optical system;
   (B) moving means for moving the imaging optical system in accordance with the signal time-sequentially put out from said focusing-state signal generating means; and
   (C) means connected between said focusing-state signal generating means and said moving means for eliminating fluctuation in the movement of said moving means.

14. A system for detecting a state of focusing of the imaging optical system and generating output representing the focusing state, comprising:
   (A) image sensing means for sensing and image of an object formed by the imaging optical system and generating a signal representing the image of the object;
   (B) focus detecting means for receiving the signal from said image sensing means on the object, said focus detecting means generating output representing the focusing state;
   (C) detecting means for discriminating a pattern of the change of the output from said focus detecting means to detect that the output from said focus detecting means has changed in accordance with a predetermined pattern; and
   (D) adjusting means for adjusting the output from said focus detecting means in accordance with said predetermined pattern to put out the adjusted output when said detecting means detects that the output from said focus detecting means is changed in accordance with said predetermined pattern;
   wherein said predetermined pattern corresponds to a change from the in-focus state to the defocused state in the output from said focus detecting means, and said adjusting means adjusts the output from said focus detecting means, which indicates a defocused state, to output indicating the in-focus state.

15. A system for sequentially detecting a state of focusing of an imaging optical system and sequentially generating output representing the focusing-state, comprising;
   (A) image sensing means having signal integrating effects for sequentially and cyclically sensing an image of the object formed by the imaging optical system and generating a signal representing the image of the object in each cycle of sensing operation of said sensing means;
   (B) focus detecting means for receiving the signal from the imaging optical system on the object, said focus detecting means generating output representing the focusingstate in each cycle of sensing operation of said image sensing means;
   (C) control means for controlling the integrating time of said image sensing means as a function of the brightness of the object;
   (D) detecting means for discriminating change of said integrating time controlled by said control means to detect a predetermined pattern in the change of the integrating time; and
   (E) adjusting means for adjusting the output of said focus detecting means in accordance with said pattern to put out the adjusted output when said detecting means detects that a change of the integrating time follows said predetermined pattern.

16. A system according to claim 15, wherein said predetermined pattern of the change of said integrating time corresponds to the reduction of said integrating time, and said adjusting means comprises means for holding the output of said focus detecting means.

17. A system according to claim 1 or 2, further comprising:
   display means for displaying the focusing state of the imaging optical system on the object in accordance with the output of said focus detecting means, said display means including display light-emitting means; and
   display luminance controlling means responsive to said integrating time controlling means to control an apparent brightness of said display light-emitting means in accordance with the signal integrating time of said image sensing means which is determined by said integrating time controlling means.

18. A system for repeatedly detecting a state of focusing of an imaging optical system and repeatedly generating an output representing the focus state, comprising:
   (A) image sensing means for repeatedly sensing an image of a object formed by the imaging optical system and generating a signal representing the image of the object in each repetition of the sensing operation of said image sensing means;
   (B) focus detecting means for receiving the signal from said image sensing means and detecting a focusing state of the imaging optical system on the object, said focus detecting means generating an output representing the focusing state in each repetition of the sensing operation of said image sensing means;
   (C) holding means for holding an output of said detecting means, a holding time of said holding means corresponding to the time period required for one sensing operation of said image means, and (D) means for stabilizing abrupt changes between the outputs sequentially provided in two consecutive repetitions of the sensing operation of said image sensing means for said focus detecting means.

19. A system for detecting a state of focusing of an imaging optical system on an object, comprising:
   (A) focusing state signal generating means for detecting an image of the object formed by the imaging optical system and discriminating a focusing-state of the imaging optical system to sequentially generate a signal representing the focusing-state of the imaging optical system;
   (B) display means for displaying the focusing-state of the imaging optical system in accordance with the signal which is time-sequentially put out from said focusing state signal generating means; and
   (C) means connected between said focusing-state signal generating means and said display means and comprisingly:
   memory means for storing the output of said focusing state signal generating means and
   means for selecting an output of said memory means and a new output of said focusing state signal generating means as the output of said focusing state signal generating means according to the conditions in said focus detecting system.

20. A system according to claim 19, wherein said imaging optical system is a photo-taking lens of a camera.

21. A system for detecting a state of focusing of an imaging optical system on an object and moving the imaging optical system on the basis of the detecting result to achieve an in-focus state of the imaging optical system on the object, comprising:
   (A) focusing-state signal generating means for detecting an image of the object formed by the imaging optical system and discriminating the focusing-state of the imaging optical system to time-sequentially generate a signal representing the focusing-state of the imaging optical system;
   (B) moving means for moving the imaging optical system in accordance with the signal time-sequentially put out from said focusingstate signal generating means; and
   (C) means connected between said focusing-state signal generating means and said moving means and comprising:
   memory means for storing the output of said focusing-state signal means; and
   means for selecting an output of said memory means and a new output of said focusing-state signal means as the output of said focusing-state signal means according to the conditions in said focus detecting system.

22. A system for detecting a state of focusing of an imaging optical system on an object, comprising:
   (A) focusing state signal generating means for detecting an image of the object formed by the imaging optical system and discriminating a focusing-state of the imaging optical system to sequentially generate a signal representing the focusing-state of the imaging optical system;
   (B) display means for displaying the focusing-state of the imaging optical system in accordance with the signal which is timesequentially put out from said focusing state signal generating means;
   (C) detecting means for discriminating a pattern of the change of the output from said focusing state signal generating means to detect that the output from said focusing state signal generating means has changed in accordance with a predetermined pattern; and
   (D) adjusting means for adjusting the output from said focusing state signal generating means in accordance with said predetermined pattern to put out the adjusted output when said detecting means detects that the output from said generating means has changed in accordance with said predetermined pattern.

23. A system according to claim 22, wherein said imaging optical system is a photo-taking lens of a camera.

24. A system for detecting a state of focusing of an imaging optical system, comprising:
   (A) focus detecting means for detecting an image of an object formed by the imaging optical system and discriminating the focusing-state of the imaging optical system to time-sequentially generate an output representing the focusing-state of the imaging optical system;
   (B) holding means for holding an output from said focus detecting means which represents the focusing-state of the imaging optical system after the generation of said output until the generation of an output next in sequence thereafter;
   (C) focusing state outputting means whose operation is controlled in accordance with the output of said focus detecting means; and
   (D) means for stabilizing operation of said focusing state outputting means against fluctuations in the output of said focus detecting means due to changes in conditions in said focus detecting system.

25. A system for detecting a state of focusing of an imaging optical system on an object, comprising:
   (A) focusing state signal generating means for detecting an image of the object formed by the imaging optical system and discriminating a focusing-state of the imaging optical system to sequentially generate a signal representing the focusing-state of the imaging optical system;
   (B) detecting means for discriminating a pattern of the change of the output from said focusing state signal generating means to detect that the output from said focusing state signal generating means has changed in accordance with a predetermined pattern; and
   (C) adjusting means for adjusting the output from said focusing state signal generating means in accordance with said predetermined pattern to put out the adjusted output when said generating means generates the output from said generating means changed in accordance with said predetermined pattern, said adjusting means adjusting the output from said generating means so as to prior provide a signal indicating in-focus state.

26. An apparatus comprising:
   (A) sensing means for repeatedly sensing radiation corresponding to an image of an object and, in each repetition of said sensing operation of said image sensing means, generating a signal representing the image of the object;
   (B) focus detecting means for detecting a focusing state of an optical system on the object on the basis of the signal generated by said sensing means, said detecting means generating a focusing state signal in each repetition of said sensing operation;

(C) holding means for holding the focusing state signal, said holding means having a holding time which corresponds to a period required for one sensing operation of said image sensing means; and (D) means for stabilizing the focusing state signal against fluctuation in the output of said focus detecting means due to changes in conditions in said apparatus.

27. An apparatus according to claim 26, wherein said means for stabilizing operation comprises:

(A) detecting means for discriminating a pattern in the change of said focusing state signal; and (B) adjusting means for adjusting the focusing state signal in accordance with the pattern.

28. An apparatus according to claim 26, wherein said means for stabilizing operation comprises:

(A) memory means for storing said focusing state signal; and (B) selecting means for selecting an output of said memory means and a new focusing state signal according to a condition in said apparatus.

29. An apparatus according to claim 26, wherein said sensing means senses the image of the object formed by radiation incident through said optical system.

30. A system for detecting a state of focusing of an image optical system and generating an output representing the focus state of said optical system, comprising:

(a) image sensing means for sensing light passing through the image optical system and generating a signal representing the state of the sensed light;

(b) focus detecting means for receiving said signal generated by said image sensing means to generate an output representing the focus state of the optical system;

(c) output means for outputting said output from said focus detecting means; and (d) adjusting means for adjusting a response of said output means which is corresponding to the change of the output from said focus detecting means after the output from said focus detecting means has represented that said optical system is in an in-focus state, said adjusting means causing said output means to output a signal indicating in-focus state, when said focus detecting means has generated a signal indicating in-focus state even if after the generating of the signal indicating in-focus state said focus detecting means next generates a signal indicating an out-of-focus state.

31. A system according to claim 30, wherein said output means comprises display means for displaying in-focus state and out-of focus state.

* * * * *